United States Patent
Zhang et al.

(10) Patent No.: US 10,031,788 B2
(45) Date of Patent: Jul. 24, 2018

(54) REQUEST PROFILE IN MULTI-THREADED SERVICE SYSTEMS WITH KERNEL EVENTS

(71) Applicant: NEC Laboratories America, Inc., Princeton, NJ (US)

(72) Inventors: Hui Zhang, Princeton Junction, NJ (US); Guofei Jiang, Princeton, NJ (US); Junghwan Rhee, Princeton, NJ (US); Nipun Arora, Plainsboro, NJ (US)

(73) Assignee: NEC Corporation (JP)

( * ) Notice: Subject to any disclaimer, the term of this patent is extended or adjusted under 35 U.S.C. 154(b) by 82 days.

(21) Appl. No.: 15/265,267

(22) Filed: Sep. 14, 2016

(65) Prior Publication Data

US 2017/0132053 A1    May 11, 2017

Related U.S. Application Data

(60) Provisional application No. 62/252,692, filed on Nov. 9, 2015.

(51) Int. Cl.
G06F 3/00 (2006.01)
G06F 9/44 (2018.01)
G06F 9/46 (2006.01)
G06F 13/00 (2006.01)
G06F 9/54 (2006.01)
G06F 9/445 (2018.01)

(52) U.S. Cl.
CPC .......... *G06F 9/542* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 2003/0097617 A1* | 5/2003 | Goeller | ............... | G06F 11/0748 714/39 |
| 2004/0010294 A1* | 1/2004 | Kleine | ................. | A61N 1/3622 607/18 |
| 2014/0109112 A1* | 4/2014 | Zhang | ..................... | G06F 9/542 719/318 |
| 2015/0226797 A1* | 8/2015 | Moore | .................... | G06F 11/00 714/726 |

* cited by examiner

*Primary Examiner* — Craig C Dorais
(74) *Attorney, Agent, or Firm* — Joseph Kolodka

(57) ABSTRACT

Methods and systems for profiling requests include generating request units based on collected kernel events that include complete request units and half-open request units. The generated request units are sequenced based on a causality relationship set that describes causality relationships between kernel events.

17 Claims, 8 Drawing Sheets

REQUEST PROFILE IN MULTI-THREADED SERVICE SYSTEMS WITH KERNEL EVENTS

RELATED APPLICATION INFORMATION

This application claims priority to U.S. Provisional Application No. 62/252,692 filed on Nov. 9, 2015, incorporated herein by reference in its entirety.

BACKGROUND

Technical Field

The present invention relates to multi-threaded request profiling and, more particularly, to using end-to-end request profiling that builds request traces based on low-level kernel events.

Description of the Related Art

As software complexity increases, predicting the internal states of all relevant components becomes increasingly difficult when unexpected problems occur. Retracing the history of execution flows is cumbersome and the overwhelming number of different hardware and software combinations, different workload characteristics, and different end user usage patterns further complicate the problem.

Existing systems for request processing path discovery use a variety of approaches, for example by monitoring thread and communication activities of the components of a system. Existing systems are often dependent on particular system implementations and specific software being present in the target system.

SUMMARY

A method for profiling requests includes generating request units based on collected kernel events that include complete request units and half-open request units using a processor. The generated request units are sequenced based on a causality relationship set that describes causality relationships between kernel events.

A system for profiling requests includes a request unit generating module that includes a processor configured to generate request units based on collected kernel events that include complete request units and half-open request units. A request unit sequencing module is configured to sequence the generated request units based on a causality relationship set that describes causality relationships between kernel events.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide precise request processing path discovery. While the present embodiments are discussed with respect to distributed applications, it should be understood that the present principles may be applied to any appropriate processing system. A given request unit may belong to service processes distributed over multiple machines, to processes residing on a same device, or to multiple threads within a single process. The present embodiments reconstruct the kernel execution traces of a request in a service system by instrumenting core kernel functions, including system-level operating system calls.

Two types of request units are defined based on a configurable marking event set. The collected kernel event traces are sliced, transforming the event traces into multiple per-thread request units based on the event set. A graph search builds virtual request units across threads in a thread pool based on their per-thread request units. All request units invoked by the same request are grouped together based on event causality. In this manner, the present embodiments target low-overhead, end-to-end tracing captures the flow (including the path and timing) of individual requests within and across the components of a distributed service system.

Figure 1:
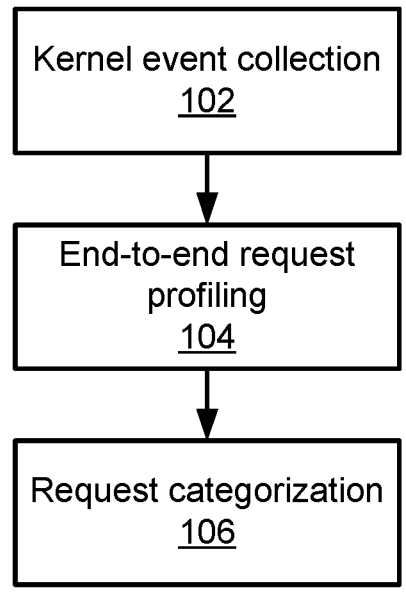
FIG. 1 is a block/flow diagram of a method of request analysis in accordance with embodiments of the present invention.

Referring now in detail to the figures in which like numerals represent the same or similar elements and initially to FIG. 1, a method for request analysis is shown. Block 102 performs kernel event collection, collecting the kernel event traces from a target system. The kernel event traces can be obtained from individual service machines by instrumenting core kernel functions, including system-level operating system calls as well by other routes.

Block 104 performs end-to-end request profiling by analyzing the kernel event traces collected by block 102. Block 104 constructs end-to-end request traces which include kernel events belonging to service processes distributed over multiple machines, processes residing on a single device, or multiple threads within a single process (e.g., in the case of a pool of threads executing a single request cooperatively and collectively.

The terms "cooperative" and "collective" refer to the group behavior characteristics of threads in a system. Cooperative behavior refers to a request that is processed by more than one thread cooperatively. In cooperative behavior, one thread may, for example, accept a connection while a worker thread handles the sending and receiving of packets. Collective behavior refers to a group of threads/processes taking a similar role and alternating in the handling of requests in a pool. A given request may involve multiple threads in a non-deterministic way.

Block 106 categorizes the request traces output by block 104. The traces may be categorized by, e.g., grouping requests based on the marking kernel events used by block 104. Other categorizing processes may use, e.g., data mining clustering to learn categories.

The output, end-to-end request traces that capture the flow (i.e., the path and timing) of individual requests across the components of a distributed system, may be used for many different purposes. One such purpose is for debugging during and after development of the software, where the request traces make it possible to determine where bugs occur and how to address them. Another potential use for request traces is bottleneck analysis, determining where performance bottlenecks occur. The request traces can also be used to determine whether a given device was involved in processing a given request and how much time was spent on each component. Machine learning and data mining can be used to detect anomalies with request traces, recognizing when abnormal activity occurs.

In addition, automated system management based on the request traces can be implemented, where administrative actions are taken based on request traces. Exemplary administrative actions include system resource allocation, for example by providing additional computing resources to devices that have a high system load due to handling request units; security mitigation actions, for example raising a security level and issuing security alerts when anomalous activity is detected; and environmental control actions, for example increasing cooling or changing coolant flow distribution when particular devicse are under heavy load.

Figure 2:
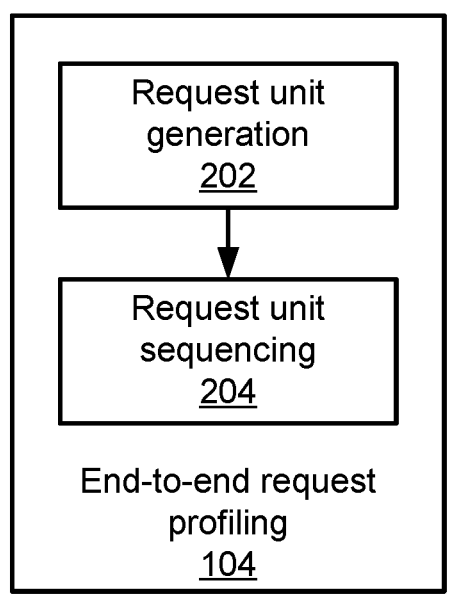
FIG. 2 is a block/flow diagram of a method of request profiling in accordance with embodiments of the present invention.

Referring now to FIG. 2, additional detail on the end-to-end request profiling of block 104 is shown. In particular, block 202 generates two types of request units from the collected kernel events based on a configurable marking event set. Block 202 also builds virtual request units across threads in a thread pool based on their per-thread request units. Block 204 constructs full-path request traces by composing relevant request units based on the causality relationship between request units and which is defined on the marking event set and temporal relationships.

Figure 3:
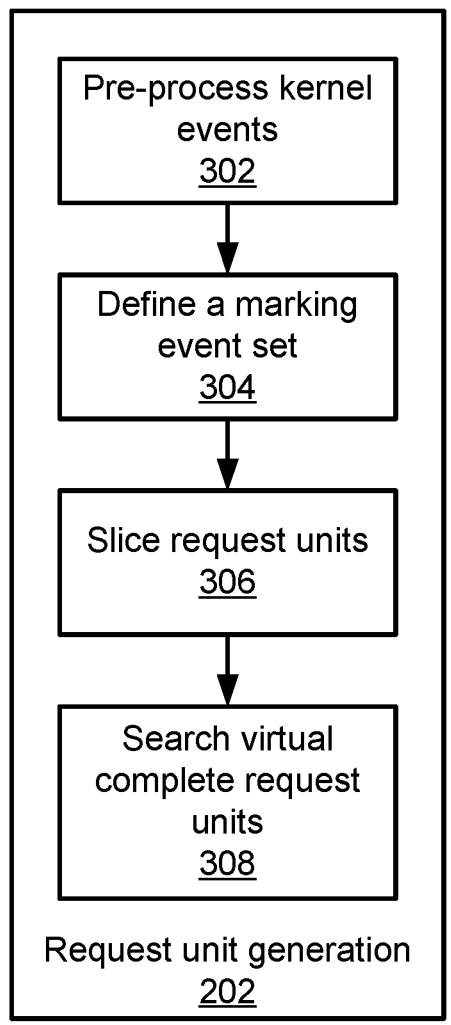
FIG. 3 is a block/flow diagram of a method of request unit generation in accordance with embodiments of the present invention.

Referring now to FIG. 3, additional detail on the request unit generation of block 202 is shown. In particular, block 302 pre-processes the collected kernel events. The kernel events are organized by their per-thread event sequence ordered by the time when the kernel events occur. This can be accomplished based on context switch kernel events which tell the time at which a thread or process runs on a processor. The original kernel events include the information on when and at which processor the kernel events occur. After pre-processing, a 5-tuple event record is generated to present each kernel event. An exemplary 5-tuple format is: <owner ID, time_begin, time_end, event type, event data>.

The term "owner ID" refers to the identity of the event owner, which may include a machine name (e.g., the machine MAC or IP address), a process ID (e.g., the thread identifier if the event is generated by a thread), and optionally a process name. This identifier describes at which machine and by which process the event is generated.

The term "time_begin" refers to the time when the kernel event starts.

The term "time_end" refers to the time when the kernel event ends.

The term "event type" refers to the kernel event type. Examples of kernel event types include, but are not limited to, network events (e.g., TCP_SEND and TCP_RECV), process events (e.g., PROCESS_CREATE), and system call events. Application program execution events such as entering or exiting an application function can also be collected as kernel events through special logging tools. Special event types such as AP_FUNCTION_ENTER and AP_FUNCTION_EXIT can be defined for those application events.

The term "event data" refers to any extra information associated with kernel event types. Examples of event data include, but are not limited to, network event data (e.g., network flow data for TCP_SEND and TCP_RECV such as a destination IP address, a source IP port, a destination IP port, packet size, etc.), inter-process communication event data (e.g., <ID, size>for PIPE_WRITE and PIPE_READ), process event data (e.g., child process identification for PROCESS_CREATE), system call event data (e.g., system call function names such as read and write), and application event data (e.g., function identifiers for AP_FUNCTION_ENTER and AP_FUNCTION_EXIT).

The output of block 302 is a set of threads described by owner IDs, with each thread having a time-ordered event record sequence where the event records have the same owner ID as the thread.

Block 304 defines a marking event set that includes request unit marks represented by a 4-tuple record: <begin_event_type, end_event_type, owner_filter, event_data_filter>.

The term "begin_event_type" refers to the event type that the first event of a request unit must exactly match. Examples include, but are not limited to, network event types (e.g., TCP_RECV), inter-process communication event types (e.g., PIPE_WRITE), process event types (e.g., PROCESS_CREATE), system call event types (e.g., KWAKEUP), and application event types (e.g., AP_FUNCTION_ENTER).

The term "end_event_type" refers to the event type that the last event of a request unit must exactly match. As with begin_event_type, examples include but are not limited to network event types, inter-process communication event types, process event types, system call event types, and application event types.

The term "owner_filter" refers to the owner ID that the first and last events of a request unit must partially or exactly match. Examples include, but are not limited to, a specific thread name (e.g., httpd), a specific thread ID number, or a wild card (e.g., '*', which matches any owner ID).

The term "event_data_filter" refers to event data that the first and last events of a request unit must partially or exactly match. Examples include, but are not limited to, network event data (e.g., [source IP port=80] for TCP_SEND or TCP_RECV), inter-process communication event data (e.g., a wild card for PIPE_WRITE or PIPE_READ), and application event data (e.g., [Function ID=1000] for AP_FUNCTION_ENTER and AP_FUNCTION_EXIT). A wild card in this field matches any event data. The event data filters can be different for the first and last events.

The output of block 304 is a set of request unit marks which will be used to detect the beginning and ending of request units in the event record sequences from block 302.

Block 306 slices request units. One request unit is defined through a time-ordered event sequence data structure <S>, where S is an event record sub-sequence of one thread. Slicing keeps track of two types of request units: half-open request units which have either the beginnings or endings detected, but not both, and complete request units which have both the beginnings and the endings detected. Block 306 scans one event after another in a thread's event sequence, checks the event with event marks on the begin event type and end event type, creates a new half-open request unit if its first beginning or ending event is detected, and closes an open request unit as a complete request unit when the ending event of an open request unit having only a beginning event is detected. Additional detail on request unit slicing will be provided below. Block 306 outputs the two detected types of request units.

Block 308 builds virtual complete request units across threads in a given machine based on the per-thread half-open request units supplied by block 306. Block 308 first finds the pairs of request units based on their beginning or ending event records. For each pair, block 308 builds a causality graph based on kernel events and the two events from the request units. Block 308 searches a path in the causality graph (a default path to search may be the shortest path in traversed links) from the beginning event to the ending event of the two request units. If such a path exists, block 308 constructs a virtual complete request unit which corresponds to the discovered path.

Figure 4:
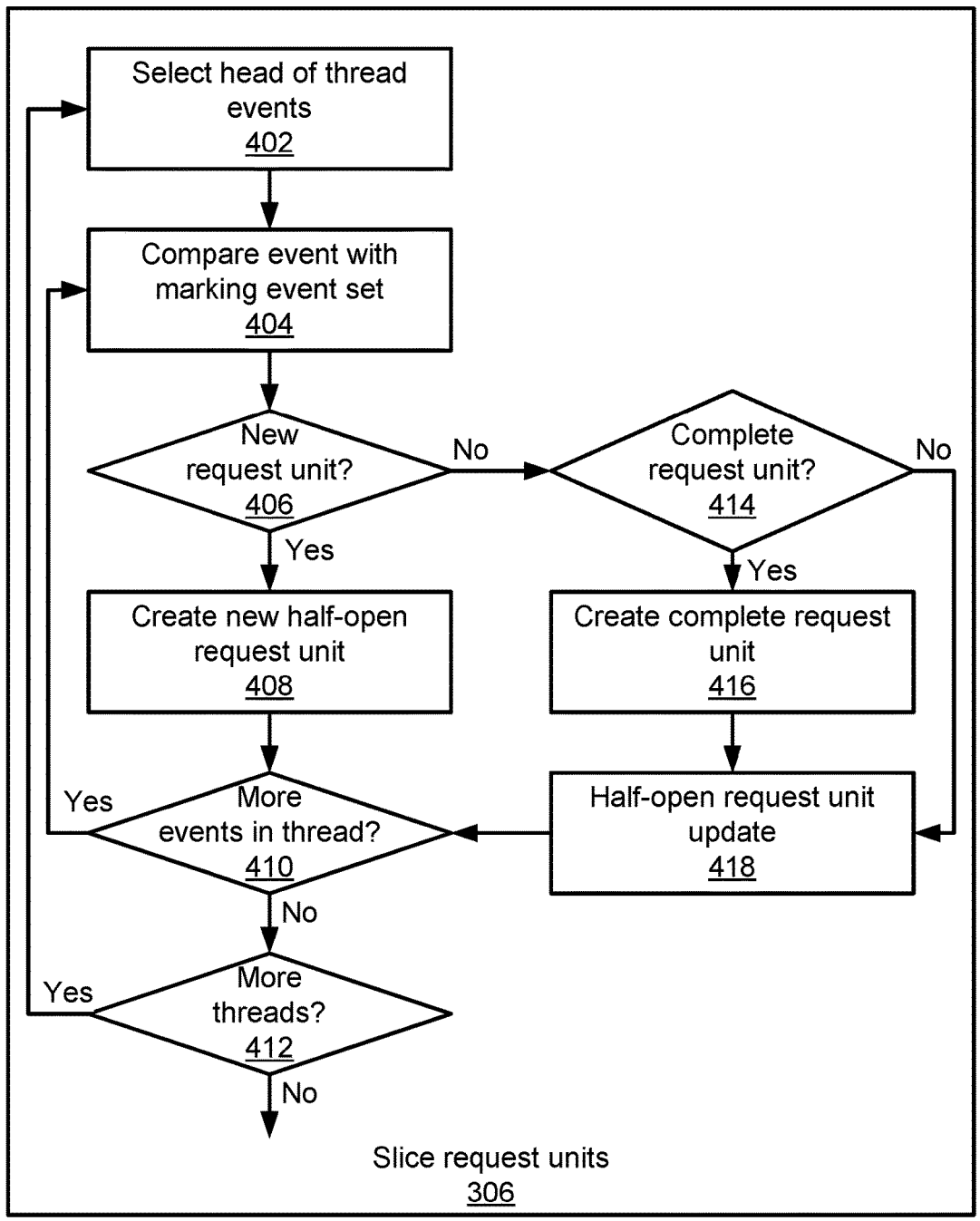
FIG. 4 is a block/flow diagram of a method of request unit slicing in accordance with embodiments of the present invention.

Referring now to FIG. 4, additional detail on the slicing of request units in block 306 is shown. Block 402 selects a head event in a thread. This initialized empty request unit sets $RU_{globalComplete}$ and $RU_{globalHalfOpen}$ and selects the first event record $e_c$ from the thread p's event record sequence $E_p$. For each request unit mark $M_i$ in the marking event set M from block 304, block 404 compares the event record $e_c$ with the marking event set by checking if the owner_filter of $M_i$ matches p's owner ID and, if so, checking if the begin_event_type of $M_i$ matches $e_c$'s event type and if the event_data_filter in $M_i$ matches $e_c$'s event data.

If both are matched, then this is not a new request unit and block 414 checks whether any request unit R in $RU_{halfOpen}$ has the beginning event record in its event record sequence S that matches the begin_event_type and event_data_filter in $M_i$. If there is such a request unit R, then block 414 checks whether R has any event record in its event record sequence S that matches the end_event_type and event_data_filter in $M_i$. If so, event record $e_R$ is assigned to be the last such event record. If time_begin($e_c$)−time_begin($e_R$)>Δ(a configurable time threshold), block 416 moves R from $RU_{halfOpen}$ into $RU_{complete}$ to create the complete request unit, a new request unit N is created in $RU_{halfOpen}$ in block 418, $e_c$ is inserted as the beginning event record in N's event record sequence, and $M_i$ is inserted as the beginning mark in N's request unit mark set. Block 410 determines whether there are more events in the thread. If so, processing returns to block 404 with the next event in the thread p's event sequence.

If block 406 instead detects a new request unit, block 408 checks if the end_event_type in $M_i$ matches $e_c$'s event type and if event_data_filter in $M_i$ matches $e_c$'s event data. If both are matched, and if any request unit R in $RU_{halfOpen}$ has the beginning event record in its event record sequence S matching the begin_event_type and event_data_filter in $M_i$, block 406 updates $e_c$ as the ending event record in N's event reord sequence if it has no duplicate copy in the sequence and insets $M_i$ as the ending mark in N's request unit mark set. Otherwise, block 406 creates a new request unit N in $RU_{halfOpen}$, with $e_c$ being marked as the ending event record in N's event record sequence S and inserts $M_i$ as the ending mark in N's request unit mark set. Block 410 determines whether there are more events in the thread p and, if so, processing returns to block 404 with a new event selected.

Any request units in $RU_{halfOpen}$ that have both beginning and ending event records are migrated into $RU_{globalComplete}$. Migrating a request unit involves filling in the intermediate events between the beginning and ending event records from the corresponding thread's event record sequence. Any remaining request units in $RU_{halfOpen}$ are moved to $RU_{globalHalfOpen}$.

One all of the events in a thread have been processed, block 412 determines whether there are more threads to process. If so, a new thread p is selected and processing returns to block 402. If not, the two types of request units are output, with request units in $RU_{globalComplete}$ being output as the detected complete request units and with request units in $RU_{globalHalfOpen}$ being output as the detected half open request units, where either the beginning or ending event record is detected, but not both.

Figure 5:
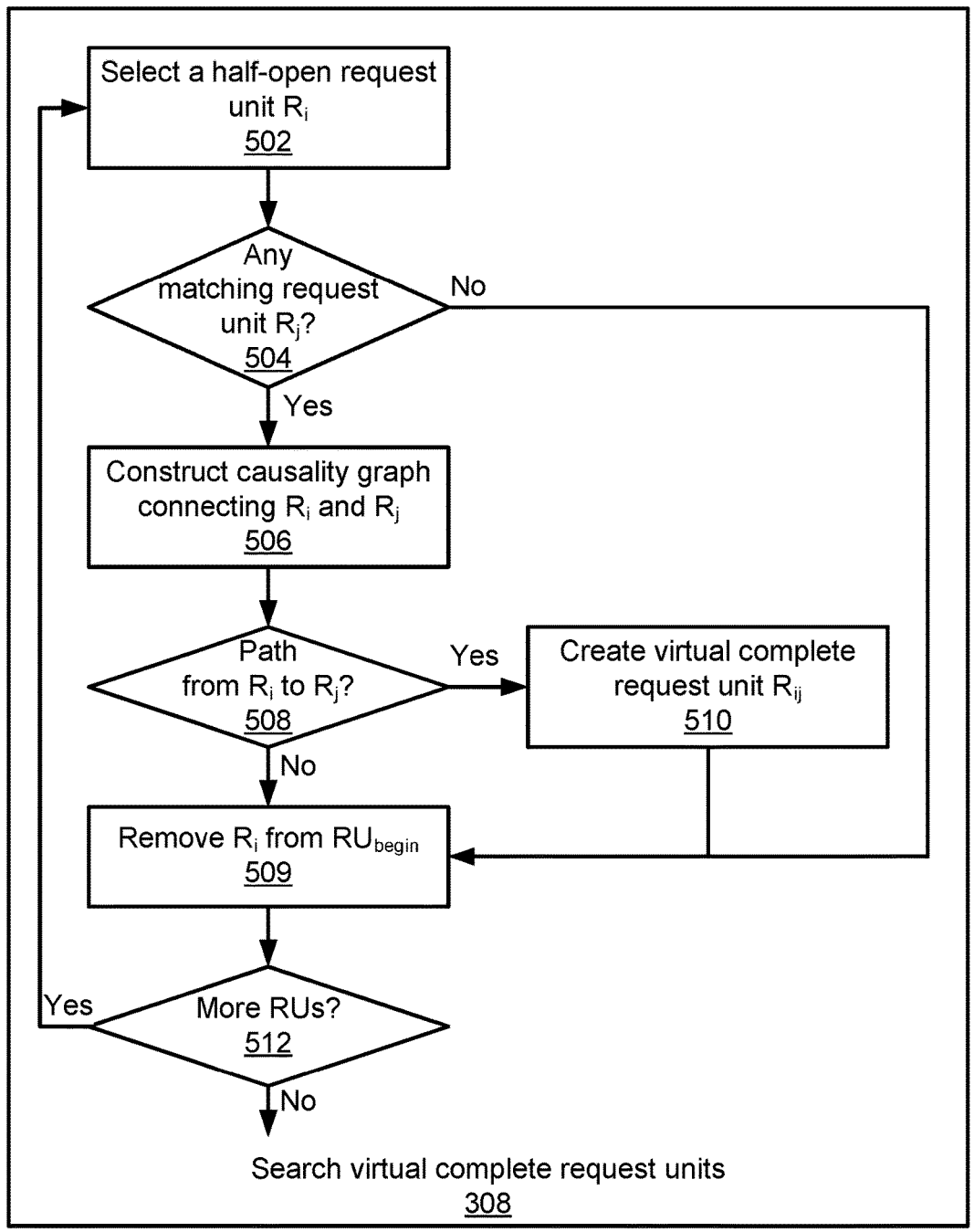
FIG. 5 is a block/flow diagram of a method of searching virtual complete request units in accordance with embodiments of the present invention.

Referring now to FIG. 5, additional detail on the search of virtual complete request units in block 308 is shown. Block 502 begins by selecting a half-open request unit $R_i$ from the set of request units $RU_{begin}$ in that have only beginning records. For each such half-open request unit, block 504 determines whether there is a matching request unit $R_j$ from the set of request units that have only ending event records. Block 504 determines that $R_i$ matches $R_j$ if the two events belong to two different threads on the same device, if the begin_event_type for a request unit mark $M_i$ matches $R_i$ beginning event type, if the event_data_filter in $M_i$ matches $R_i$'s beginning event data, if the end_event_type in $M_i$ matches $R_j$'s ending event type, and if the event_data_filter in $M_i$ matches $R_j$'s ending event data. If there is no match, block 509 removes $R_i$ from $RU_{begin}$.

If block 504 finds a match, block 506 constructs a causality graph connecting $R_i$ and $R_j$. The event $e_{being}$ is assigned as $R_i$'s beginning event record and the event $e_{end}$ is assigned as $R_j$'s ending event record. The causality graph G=(V, E) is constructed based on the collected kernel event traces E. For each thread in the same machine as $R_i$, the thread's subgraph is formed from the event nodes where each event $e_c$ satisfies time_begin($e_c$)≥time_begin($e_{begin}$) and time_end($e_c$)≤time_end($e_{end}$) (i.e., each event that occurs between the begin event and the end event), where $e_c$ is one of $e_{begin}$, $e_{end}$, an inter-process communication event, a process event, or a context switch event. Directed links connect each event node in the subgraph to the next event node in time order.

Between subgraphs of two threads, block 506 forms a directed link from inter-process communication events to their nearest counterpart events in time order that have matched communication parameters. A directed link is formed from a process event to its nearest counterpart event. A directed link is formed from a context switch event to its nearest counterpart event is formed in time order with matching parameters.

Based on the constructed causality graph G, block 508 attempts to find a path from $R_i$ to $R_j$. Any appropriate method may be used to find the shortest path in traversed links, such as Dijkstra's algorithm. If such a path is discovered, block 510 creates a complete request unit and adds that request unit to $RU_{globalComplate}$, with the beginning event as $e_{begin}$, with the ending event as $e_{end}$, and with intermediate events being the events of the discovered path. Block 509 then removes $R_i$ from $RU_{begin}$, regardless of whether a path is discovered. If there are more request units in $RU_{begin}$, a new $R_I$ is selected and processing returns to block 502. If not, block 512 outputs $RU_{globalComplate}$ as the set of detected complete request units.

Figure 6:
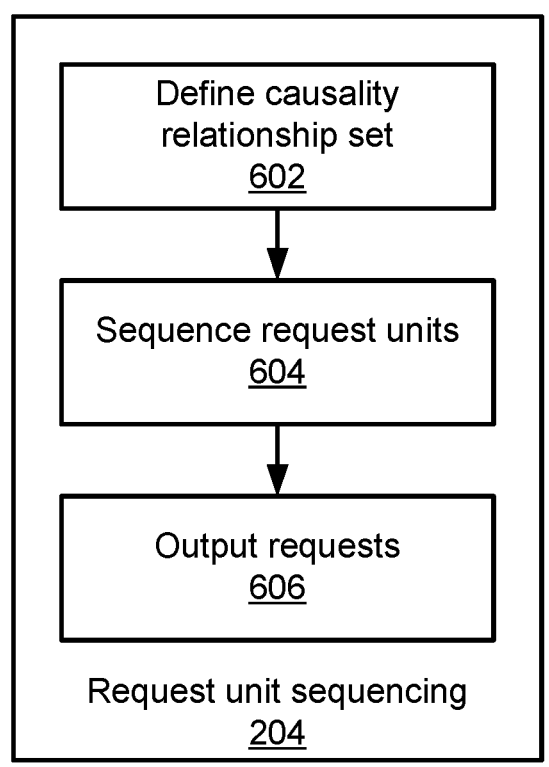
FIG. 6 is a block/flow diagram of a method of request unit sequencing in accordance with embodiments of the present invention.

Referring now to FIG. 6, additional detail on the request unit sequencing of block 204 is shown. Block 602 defines a causality relationship set that includes event association rules, each presented as a 5-tuple record: <causing_event_type, caused_event_type, time_rule, owner_rule, event_data_rule>. The causality relationships are defined through event association rules that can be provided through domain knowledge.

The term "casuing_event_type" refers to the type of events that can cause the occurrence of other events. Examples include, but are not limited to, network event types (e.g., TCP_SENCV), inter-process communication event types (e.g., PIPE_WRITE), process event types (e.g., PROCESS_CREATE), system call event types (e.g., KWAKEUP), and application event types (e.g., AP_FUNCTION_ENTER).

The term "caused_event_type" refers to the type of events that are caused by other events. Examples include, but are not limited to, network event types (e.g., TCP_RECV), inter-process communication event types (e.g., PIPE_READ), system call event types (e.g., KSLEEP), and application event types (e.g., AP_FUNCTION_EXIT).

The term "time_rule" refers to a temporal relationship that can relate a causing_event_type event and a caused_event_type event. Examples include, but are not limited to, an overlap temporal relationship (e.g., time_begin(causing_event)<time_begin(caused_event) and time_end(causing_event)>time_begin(caused_event)), a nested temporal relationship (e.g., time_begin(causing_event)<time_begin (caused_event) and time_end(causing_event)>time_end (caused_event)), and disjoint temporal relationship (e.g., time_end(causing_event)<time_begin(caused_event)).

The term "owner rule" refers to an association of a causing_event_type and a caused_event_type based on owner IDs. Examples include, but are not limited to, a specific machine name (e.g., causing_event_owner_machineName=srcIPaddress (caused_event_data)), a specific thread name (e.g., causing_event_owner_processName=httpd), a specific thread ID (e.g., caused_event_owner_threadID= causing_event_owner_threadID), or a wild card (*, which matches any owner ID).

The term "event_data_rule" refers to an association between a causing_event_type event and a caused_event_type event based on their event data. Examples include, but are not limited to, network event data (e.g., dstIPport (caused_event_data)=srcIPport (causing_event_data)), inter-process communication event data (e.g., PIPE_ID (caused_event_data)=PIPE_ID(causing_event_data)), and application event data (e.g., Function_ID(caused_event_ data)=Function_ID(causing_event_data)). A wild card in this field matches any event data.

A rule is called time-causality rule if owner_rule requires both causing and caused request units to be from the same thread or the thread pool (for a virtual complete request unit that traverse a pool of threads), and their causality relationship is decided by the time_rule. Rules matching request units from different processes are called event-causality rules.

For each request unit mark M, a rule pair CRP:($CR_{begin}$, $CR_{end}$) is defined so that the begin_event_type in M uses $CR_{begin}$ to find the associated events in other request units, and the end_event_type in M uses $CR_{end}$ to find the associated events in other request units. Either rule can be empty. Block 602 outputs a set of event association rule pairs which will be used to detect the set of relevant requite units and to compose full-path requests. The event association rules can be predefined as a default set or can be dynamically configured upon user request.

Block 604 sequences the request unit. One request R is defined through a two-item data structure <E, C>, where E is a set of request units and C is a set of relationships describing the causality between the request units in E. Sequencing includes two main procedures: for each request unit, the request units causing it are found and, after that search, a full-path transaction for each request unit with no causing request unit is constructed. The transaction is rooted at that request unit and expanded over all request units caused by that root in one hop or multiple hops. Request unit sequencing will be described in greater detail below. Block 606 outputs the sequenced requests.

Figure 7:
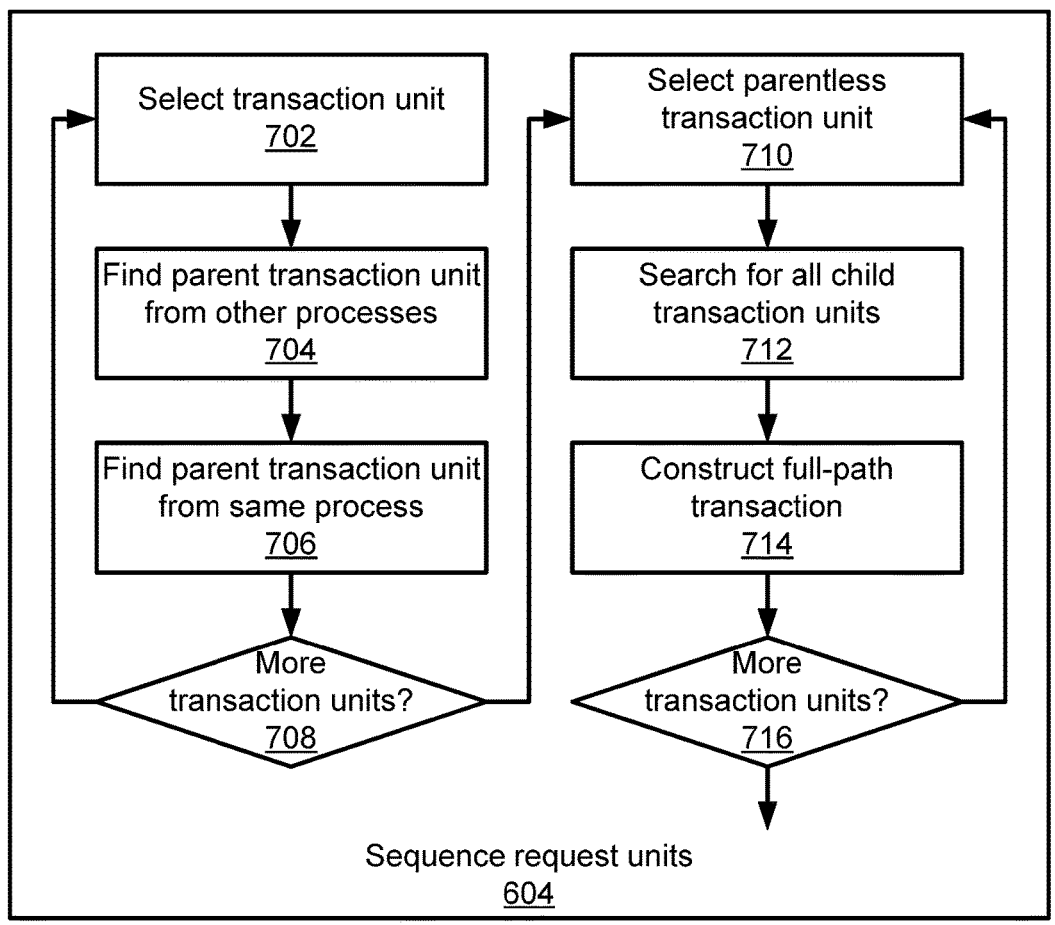
FIG. 7 is a block/flow diagram of a method of request unit sequencing in accordance with embodiments of the present invention.

Referring now to FIG. 7, additional detail on the request unit sequencing of block 604 is shown. An empty request set $RS_{global}$ is initialized and block 702 selects a new request unit $u_i$ from the request unit set U output by block 306. For each request unit $u_i$, two empty request unit sets $RU_i^{parent}$ and $RU_i^{child}$ are initialized.

Block 704 finds parent request units for $u_i$ that belong to other processes. For the beginning event record $e_i^f$ of $u_i$'s event record sequence, for each rule pair $p_x$ in the event association rule pair set output by block 602, block 704 checks if the event type of $e_i^f$ is the caused_event_type of rule $CR_{begin}$ in $p_x$. If $CR_{begin}$ is a time causality rule, block 704 then checks if there is any request unit $u_j$ in U that has the same owner as $u_i$ and has a beginning event record $e_j^f$ that can be associated with $e_i^f$ by testing $CR_{begin}$. It should be noted that $u_i$ and $u_j$ having the same owner indicates that the two request units are from the same process. If the time of $e_i^f$ and $e_j^f$ can yield "True" for the time_rule in $CR_{begin}$, block 704 yields a match.

If the event type of $e_i^f$ is the caused_event_type of rule $CR_{begin}$ in $p_x$ and $CR_{begin}$ is not a time causality rule, block 704 checks if there is any request unit $u_j$ having a first event record $e_j^f$ that can be associated with $e_i^f$ by testing the rule $CR_{begin}$ on both event records. If the event type of $e_i^f$ is the causing_event_type of $CR_{begin}$, and the time, owner IDs, and event data of $e_i^f$ and $e_j^f$ yield "True" on the rules time_rule, owner_rule, and Event_data_rule, block 704 also yields a match.

If block 704 yields a match, such that $CR_{begin}$ is satisfied, block 704 checks if the last event record $e_i^l$ in $u_i$ can be associated with the last event record $e_j^l$ in $u_j$ by testing the rule $CR_{end}$ on both last event records. If the two last event records can be associated under $CR_{end}$, $u_j$ is a causing event unit for $u_i$ and is added to $RU_i^{parent}$ while $u_i$ is added to $RU_j^{child}$. This process is repeated for every request unit, so block 708 determines whether there are more request units. If so, block 702 selects a new request unit. If not, block 710 selects a request unit that lacks a parent.

For each parentless request unit $u_i$, block 712 searches for all child request units. A new request $R_x$ is created as <$E_x$, $C_x$>, with $u_i$ being inserted into $E_x$ and with the relation "NULL->parent($u_i$)" being inserted into $C_x$. For each request unit $u_j$ in $RU_i^{child}$, if both $u_i$ and $u_j$ have only one event in their event sequence, block 714 inserts into $u_j$ all the events that belong to the same owner of $u_j$, have time_begin values larger than the time_begin value of $u_i$'s single event, and have time_begin values smaller than the value of $u_j$'s single event. Block 714 inserts $u_j$ into $E_x$ and inserts the relation "$u_i$->parent($u_j$)" into $C_x$. Each request unit $u_k$ in $RU_j^{child}$ is inserted into $RU_i^{child}$ and the relation "$u_j$>parent ($u_k$)" is added into $C_x$. The request unit $u_j$ is removed from $RU_i^{child}$ and the new request is added to $RS_{global}$. Block 716 determines whether there are more request units—if so, another parentless request unit is selected processing returns to block 710. If not, processing ends and the requests in $RS_{global}$ are output.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
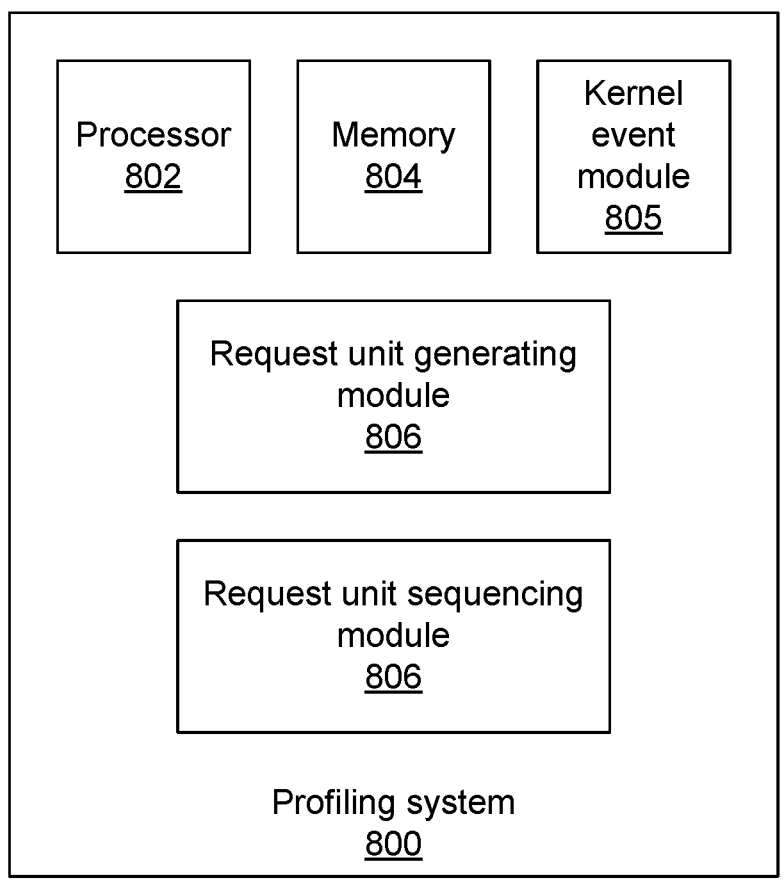
FIG. 8 is a block diagram of a request profiling system in accordance with embodiments of the present invention.

Referring now to FIG. 8, a profiling system 800 is shown. The profiling system 800 includes a hardware processor 802 and memory 804. The profiling system 800 also includes one or more functional modules. In some embodiments, the functional modules may be implemented as software that is stored in memory 804 and executed by hardware processor 802. In alternative embodiments, the functional modules may be implemented as one or more discrete hardware components in the form of, e.g., application specific integrated chips or field programmable gate arrays.

A kernel request module 805 collects kernel event traces, including operating system calls. A request unit generating module 806 generates two types of request units from collected kernel events, half-open request units and complete request units. A request unit sequencing module 806 then constructs full-path request traces by composing the request units based on a causality relationship set between request units. The profiling system 800 can thereby obtain full-path traces across multiple threads with low overhead.

Figure 9:
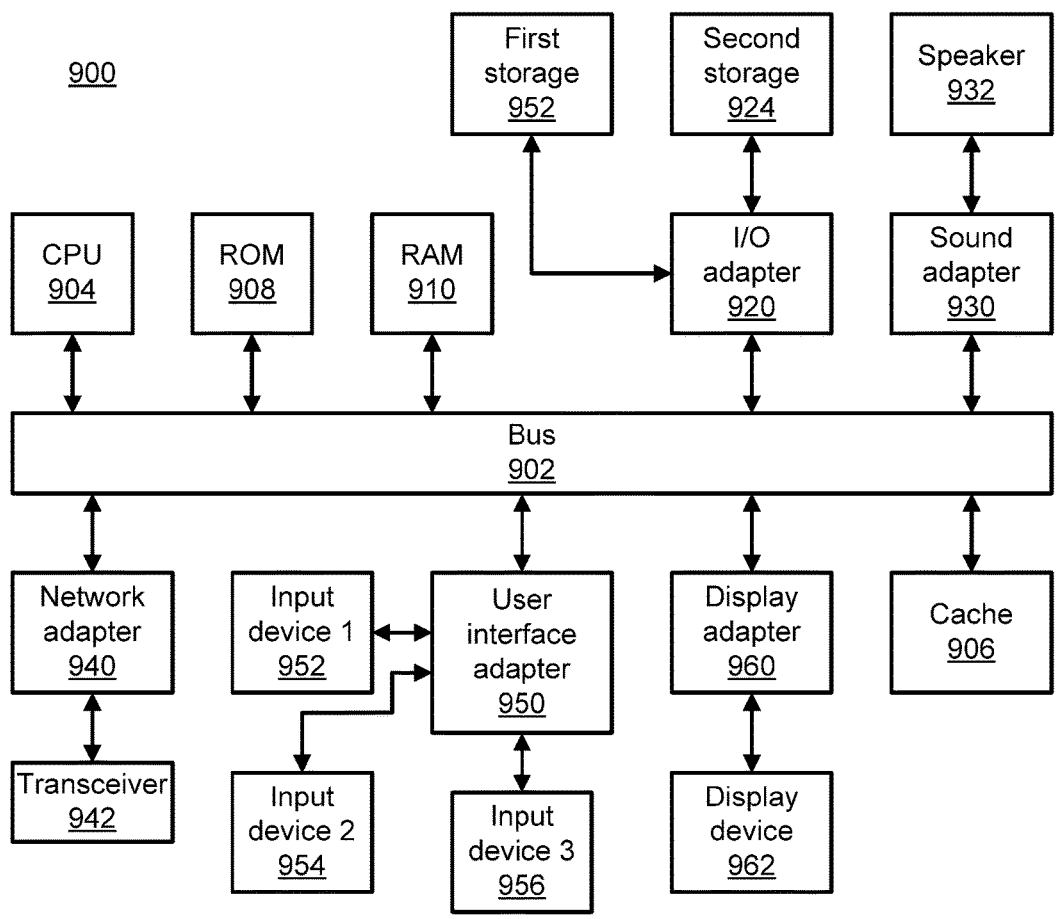
FIG. 9 is a block diagram of a processing system in accordance with embodiments of the present invention.

Referring now to FIG. 9, an exemplary processing system 900 is shown which may represent the transmitting device 100 or the receiving device 120. The processing system 900 includes at least one processor (CPU) 904 operatively coupled to other components via a system bus 902. A cache 906, a Read Only Memory (ROM) 908, a Random Access Memory (RAM) 910, an input/output (I/O) adapter 920, a sound adapter 930, a network adapter 940, a user interface adapter 950, and a display adapter 960, are operatively coupled to the system bus 902.

A first storage device 922 and a second storage device 924 are operatively coupled to system bus 902 by the I/O adapter 920. The storage devices 922 and 924 can be any of a disk storage device (e.g., a magnetic or optical disk storage device), a solid state magnetic device, and so forth. The storage devices 922 and 924 can be the same type of storage device or different types of storage devices.

A speaker 932 is operatively coupled to system bus 902 by the sound adapter 930. A transceiver 942 is operatively coupled to system bus 902 by network adapter 940. A display device 962 is operatively coupled to system bus 902 by display adapter 960.

A first user input device 952, a second user input device 954, and a third user input device 956 are operatively coupled to system bus 902 by user interface adapter 950. The user input devices 952, 954, and 956 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 952, 954, and 956 can be the same type of user input device or different types of user input devices. The user input devices 952, 954, and 956 are used to input and output information to and from system 900.

Of course, the processing system 900 may also include other elements (not shown), as readily contemplated by one of skill in the art, as well as omit certain elements. For example, various other input devices and/or output devices can be included in processing system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 900 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for profiling requests, comprising:
generating request units based on collected kernel events that include complete request units and half-open request units using a processor; and
sequencing the generated request units based on a causality relationship set that describes causality relationships between the kernel events.

2. The method as recited in claim 1, wherein the generating the request units comprises creating the half-open request units based on beginning events and ending events.

3. The method of claim 2, wherein the generating the request units further comprises creating complete request units based on ending events that match respective beginning events.

4. The method of claim 2, wherein the generating the request units further comprises generating virtual complete request units based on a causality graph that characterizes causative relationships between the kernel events.

5. The method of claim 4, wherein the generating the request units further comprises searching a shortest path in the causality graph between a beginning event in a first half-open request unit and an ending event in a second half-open request unit.

6. The method of claim 5, wherein the generating the request units further comprises determining that the beginning event and the ending event match one or more association rules.

7. The method of claim 1, wherein the causality relationship set comprises event association rules that establish at least a caused event type and a causing event type.

8. The method of claim 7, wherein each event association rule is a 5-tuple that includes the caused event type, the causing event type, a time rule, an owner rule, and an event data rule.

9. The method of claim 1, further comprising taking an administrative action responsive to the sequenced request units.

10. A system for profiling requests, comprising:
a request unit generating module comprising a processor configured to generate request units based on collected kernel events that include complete request units and half-open request units; and
a request unit sequencing module configured to sequence the generated request units based on a causality relationship set that describes causality relationships between the kernel events.

11. The system of claim 10, wherein the request unit generating module is further configured to create half-open request units based on beginning events and ending events.

12. The system of claim 11, wherein the request unit generating module is further configured to create complete request units based on ending events that match respective beginning events.

13. The system of claim 11, wherein the request unit generating module is further configured to generate virtual complete request units based on a causality graph that characterizes causative relationships between the kernel events.

14. The system of claim 13, wherein the request unit generating module is further configured search to a shortest path in the causality graph between a beginning event in a first half-open request unit and an ending event in a second half-open request unit.

15. The system of claim 14, wherein the request unit generating module is further configured to determine that the beginning event and the ending event match one or more association rules.

16. The system of claim 10, wherein the causality relationship set comprises event association rules that establish at least a caused event type and a causing event type.

17. The system of claim 16, wherein each event association rule is a 5-tuple that includes the caused event type, the causing event type, a time rule, an owner rule, and an event data rule.

* * * * *